Figure 1:
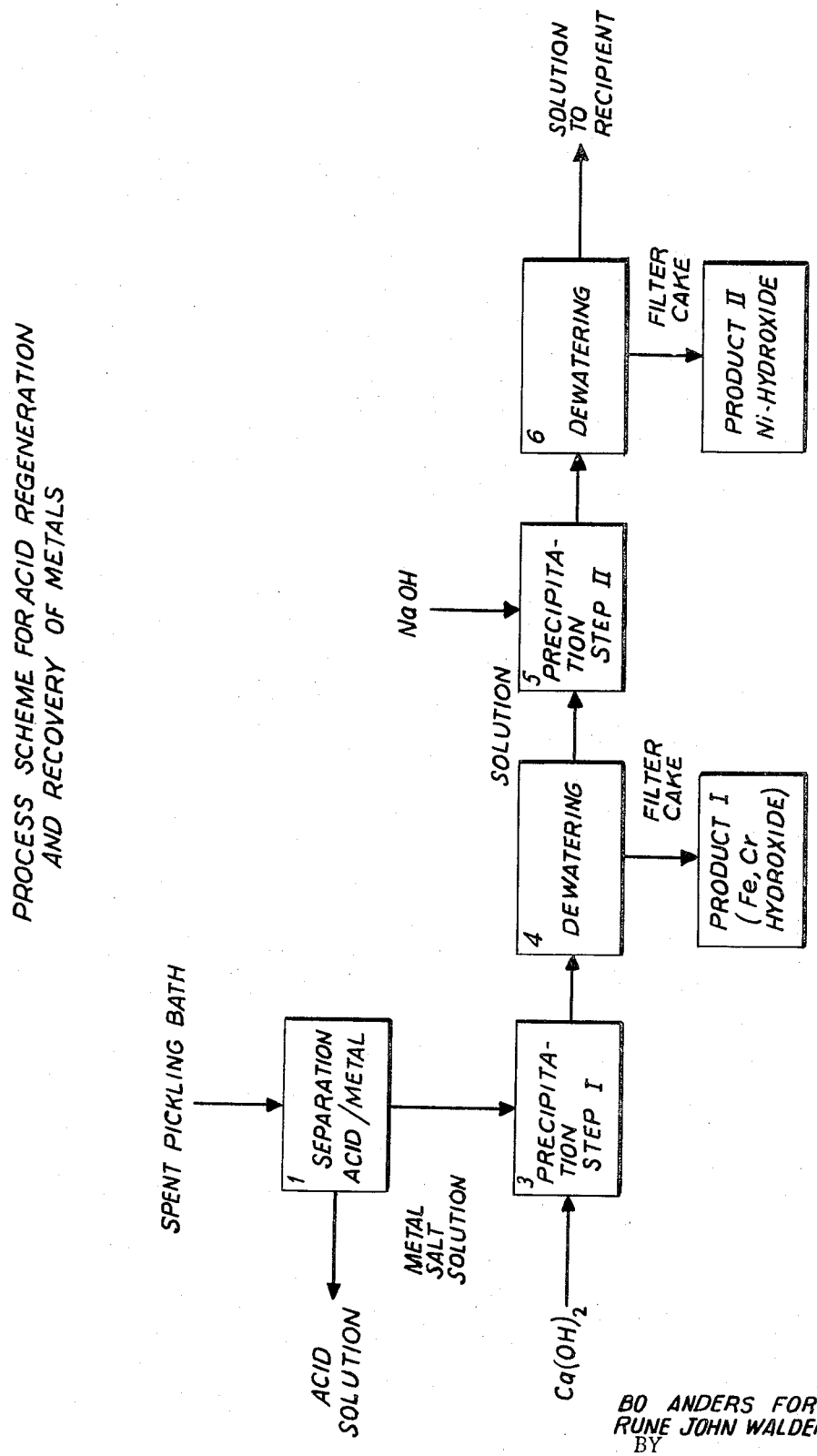

United States Patent [19]

Forsell et al.

[11] 3,800,024
[45] Mar. 26, 1974

[54] PROCESS FOR NEUTRALIZATION AND REGENERATION OF AQUEOUS SOLUTIONS OF ACIDS AND DISSOLVED METALS

[75] Inventors: Bo Anders Forsell; Rune John Valdemar Niklasson, both of Nynashamn, Sweden

[73] Assignee: Rederiaktiebolaget Nordstjernan, Stockholm, Sweden

[22] Filed: Nov. 1, 1971

[21] Appl. No.: 194,444

[30] Foreign Application Priority Data
Nov. 3, 1970 Sweden.............................. 14826/70

[52] U.S. Cl.................... 423/55, 423/144, 423/163, 423/166, 423/592, 210/42, 210/45, 75/108
[51] Int. Cl... C01g 37/02, C01g 49/02, C01g 53/04
[58] Field of Search....... 423/58, 140, 55, 144, 163, 423/166, 592, 607, 632; 75/108; 209/5; 134/41; 210/42, 45, 52, 53

[56] References Cited
UNITED STATES PATENTS

| | | | |
|---|---|---|---|
| 3,304,246 | 2/1967 | Fukui et al..................... | 423/140 X |
| 3,544,309 | 12/1970 | Fletcher et al........................ | 75/108 |
| 913,708 | 3/1909 | Dow et al. ....................... | 423/140 X |
| 3,321,649 | 5/1967 | DeBenedictis et al............... | 209/5 X |
| 3,268,071 | 8/1966 | Puddington et al...................... | 209/5 |
| 2,639,222 | 5/1953 | Tanski ............................. | 423/632 X |
| 2,798,802 | 7/1957 | Roy et al. ............................ | 423/144 |
| 3,097,064 | 7/1963 | Caldwell ......................... | 423/607 X |

OTHER PUBLICATIONS

Hoak "Industrial and Engineering Chemistry" Vol. 39, 1947, pages 614–618.

*Primary Examiner*—Edward J. Meros
*Attorney, Agent, or Firm*—Sandoe, Hopgood and Calimafde

[57] ABSTRACT

A method of treating acid solutions containing iron, chromium, nickel and fluoride ions is provided, wherein the pH of the solution is adjusted to separate the iron, chromium and fluoride ions from nickel by the precipitation of compounds thereof, and wherein the nickel is subsequently recovered from the remaining solution by precipitation.

3 Claims, 4 Drawing Figures

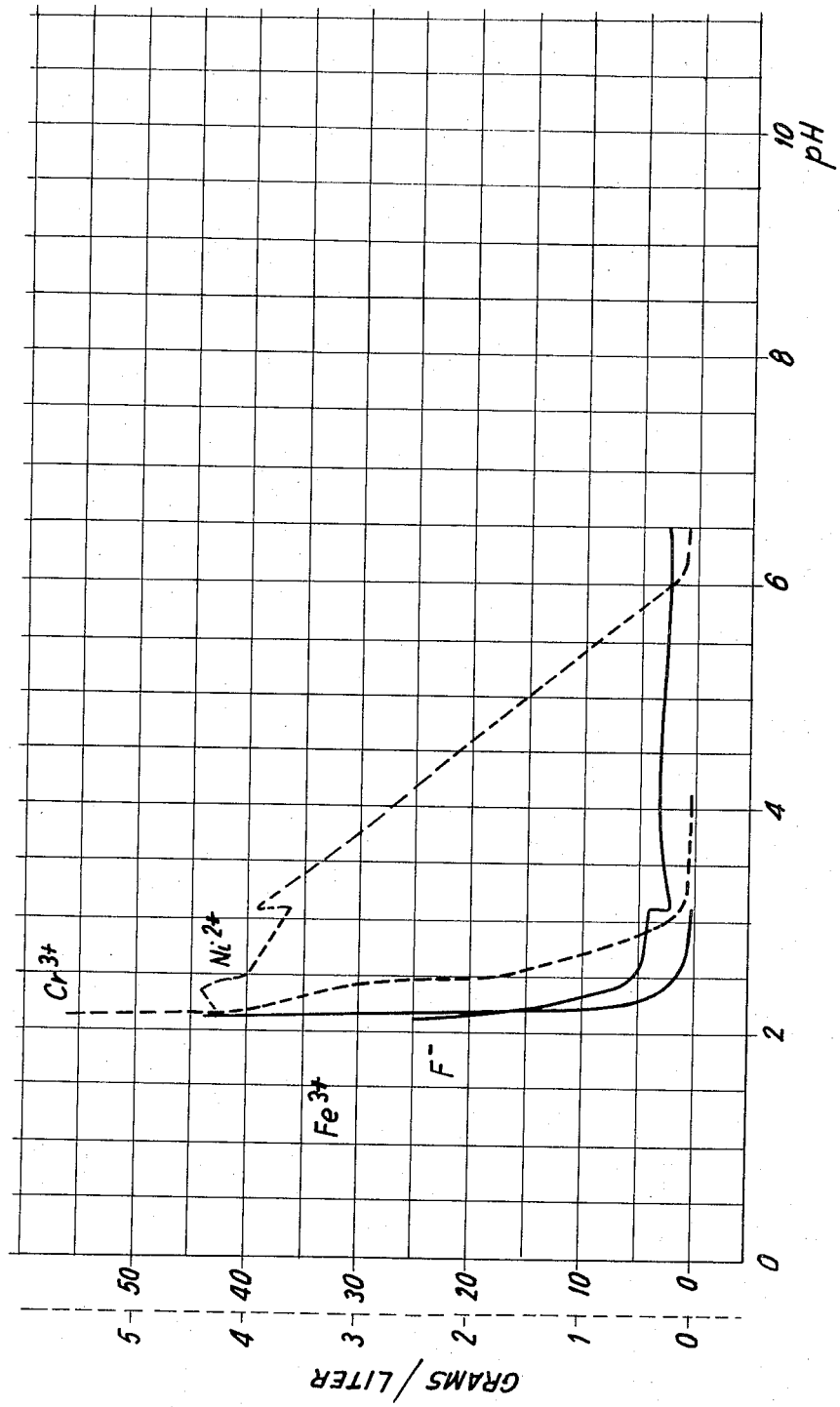

PROCESS FOR NEUTRALIZATION AND REGENERATION OF AQUEOUS SOLUTIONS OF ACIDS AND DISSOLVED METALS

In the metal working industry acid solutions are used in many processes, e.g. for dissolution of scales and oxide layers on metal surfaces. Pickling of steel articles such as wire, piping, plate etc. is often made in sulphuric acid liquors. Recently hydrochloric acid has become a more important alternative. In the galvanic industry solutions of for instance hydrochloric acid, phosphoric acid or oxalic acid are used in the surface treatment. Another example is anodic treatment of aluminum, where a solution of chromic acid is used.

With respect to volume, pickling of steel is of great importance. As mentioned above sulphuric acid or hydrochloric acid is used. In the pickling of stainless steel plate and other stainless steel articles, however, pickling liquors of nitric acid and hydrofluoric acid are often used, as the acids mentioned above can not dissolve oxides of chromium.

In all processes where acid solutions are used for surface treatment of metals, a spent solution is eventually obtained, which, in addition to the concentrations of acids present, will also sometimes contain considerable amounts of metal ions in solution. The solution should be treated in some way before being discharged as waste, as usually neither metals nor acids are permitted in the effluents.

As liquors containing nitric acid and hydrofluoric acid are of special interest, partly due to the relatively great volumes used and, partly due to the technical problems related to their treatment, the invention will be preferably described relative to such solutions. The process, however, is useful whenever acid and metal containing solutions are to be neutralised, and the modifications of the process conditions necessary in each case are clear for those skilled in the art.

In the pickling of stainless steel plate liquors of nitric acid and hydrofluoric acid are frequently used, the concentration of nitric acid often being within the range 50 – 300 g/l and that of hydrofluoric acid within the range 10 – 60 g/l. In the pickling process, a band of steel plate passes through the bath with a certain velocity or the plate articles are immersed for a certain time in said bath.

The pickling process is at present considered as a pointwise attack by nitric acid, whereby the oxide layer is broken up and loosened from the metal surface. The metal layer next to the scale is dissolved by the acid, but most of the scale is only physically removed. The nitric acid is thereby consumed and nitric oxide is evolved. Also hydrogen ions are consumed during the formation of water. The function of the hydrofluoric acid is stoichiometric; as complexes of metal fluorides are formed, the equilibria, in which the metal ions are included, are displaced in such a direction that additional dissolution of metal and metal oxide is favoured. Through the pickling reaction, the scales are removed from the metal surface, and a bright surface is obtained.

As the acid concentration is reduced because of its consumption in the chemical process, the efficiency of the pickling liquor will decrease. An improved pickling effect can be obtained again with the same solution by a temperature increase or by the addition of fresh acids to the liquor. However, after a certain time it is necessary to change the pickling liquor, ane therefore the spent solution is drained to the sewer or disposed of in some other way. For environmental protection reasons neutralization of the pickling liquor is preferred before discharging it into a recipient.

The spent pickling liquor still contains a certain amount of acid, for instance between 0.1 and 5 moles of hydrogen ion per liter and between 0.5 and 5 moles of total fluoride per liter, whereas the metal content amounts to between 0.1 and 3 moles per liter, more often 0.5–2 moles per liter. Approximately 80 percent of the metals is iron, the rest being chromium (about 10 percent), nickel (about 10 percent) and molybdenum, manganese and other alloy components in minor amounts.

At present spent pickling liquors are usually quite simply being disposed of by discharge into the nearest recipient. In some cases the acids are neutralized and the metals are precipitated as metal hydroxides by addition of an alkaline precipitation agent. Fluoride is precipitated as calcium fluoride. Spent pickling liquors of sulphuric acid are also disposed of in the same way, the sulphate ions being precipitated as calcium sulphate (gypsum). The precipitate obtained is separated from the aqueous phase, for instance by sedimentation in sedimentation ponds followed by filtration in a filter press and is disposed of at a refuse dump, into mine shafts or the like. In this process, the neutralization of the acids and the precipitation of the metals take place simultaneously. Therefore it is not possible to recover any metals or other components in the spent pickling liquors.

The present invention now refers to a process for the neutralization and regeneration of aqueous solutions of acids and dissolved metals, such as pickling baths or acid galvanic baths, by the precipitation of included ions. According to the invention, the ions are selectively precipitated in two steps by adjustment of the pH value. One object of the process is to separate acids from metal salts. Another essential object is to separate the metal ions included in the metal salt solution in order to recover nickel. Another essential object is to recycle the acid solution to the pickling baths. Through this process, the pickling baths will advantageously also be included in a closed system, a nearly constant concentration of acids and metal ions being maintained in the pickling liquor. A better and more constant quality of the plate manufactured can consequently be obtained.

Still another essential object is to obtain a liquid phase which is free from suspended solids as well as dissolved acids and metal ions so that it can be discharged into a recipient, satisfying essential demands of environment control.

The process of the present invention can be divided into 7 steps, which will be described in the following. A suitable embodiment of the invention includes steps 3–7 below.

The process is schematically shown in FIG. 1.

Step 1.

Spent pickling baths are separated into acid and metal salt fractions through methods based on diffusion or electrical or thermal phenomena. As an advantageous example acid retardation is mentioned. This process being carried out on an ion exchange resin contained in a column.

Step 2.

The acid solution from step 1 is recycled to the pickling baths after the addition of concentrated acids in order to keep the concentration on a suitable level. The amount of added acid corresponds to the amount consumed in the pickling and the losses in the metal salt solution.

Step 3.

The metal salt solution from separation step 1 (or in case steps 1–2 are not included in the process, the pickling liquor itself) is partly neutralized by the addition of an alkaline substance, for instance burnt or slaked lime. The neutralization in step 3 is carried so far, for instance by pH-regulation, that predominantly iron and chromium are precipitated as metal hydroxides.

Step 4.

The suspension from the precipitation in step 3 is dewatered, for instance on a vacuum filter. After dewatering a solid product, easy to handle, substantially consisting of iron and chromium hydroxides is obtained.

Step 5.

The solution from the dewatering step is further neutralized by the addition of more alkaline precipitation agents, for instance sodium or potassium hydroxide or ammonia, or slaked or burnt lime.

Step 6.

The suspension from the precipitation in step 5 is dewatered, for instance on a vacuum filter. After precipitation, a solid product, easy to handle, substantially consisting of nickel hydroxide is obtained.

Step 7.

The solution from the dewatering step 6 can be discharged to the recipient, as the concentrations of metals and acids has been reduced so that the environmental demands are satisfied.

In order to illustrate the process additionally an advantageous embodiment of it will be discribed in detail.

Acid is separated from metal salts by using the process taught in the U.S. Pat. Nos. 3,067,007 and 3,099,529 regarding acid retardation on ion exchangers in columns. The process is carried out in such a manner that a certain volume of acid solution is added to the ion exchange column, which contains an anion exchange resin, for instance a strongly basic anion exchange resin of an ordinary or macroporous type, obtained by copolymerization of styrene and divinyl benzene and then provided with quaternary ammonium groups in the nitrate form.

Figure 2:
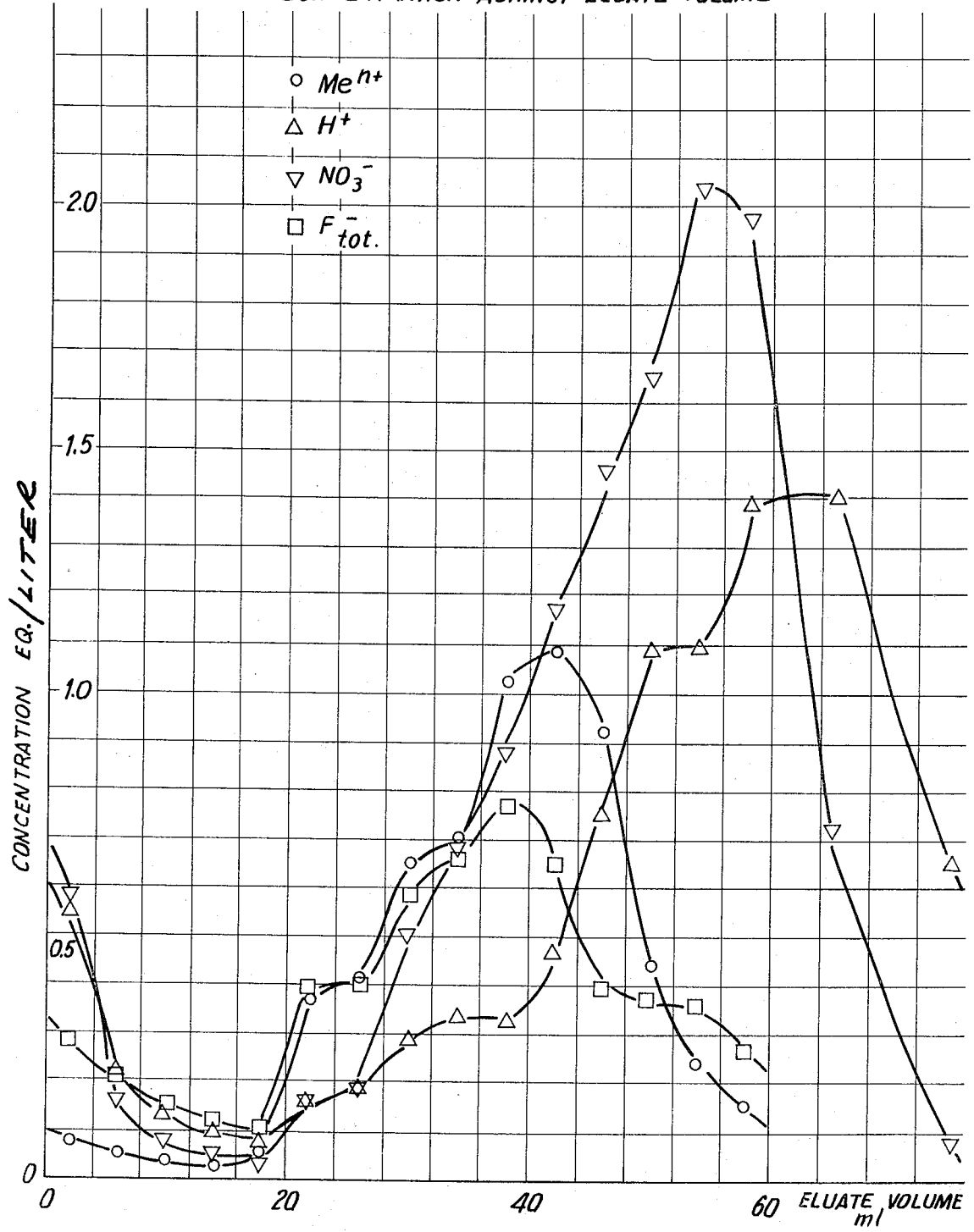

The volume is selected such that the outflow will not contain metal ions in an essential amount. A certain amount of an aqueous rinsing solution is added, to which possibly HF or $HNO_3$ has been added. The water displaces the metal salt solution in the ion exchanger, while the acids, which to a certain degree are sorbed on the ion exchange resin, will elute later. Cf. FIG. 2. After adding the carefully calculated amount of aqueous solution, pickling liquor is again added and then aqueous solution, etc, in a cyclic process.

The eluate from the column will then – as appears from FIG. 2 – contain alternatively a high concentration of acid and a high concentration of metals. By operation of valves (for instance controlled by pH) or in another manner, the acid fraction, which is separated from the metal salt solution, is recycled to the pickling baths, whereas the metal salt solution is passed on to process step 3. Most advantageously, different acid liquors are individually regenerated according to this process.

The metal salt solution from step 1 or the pickling bath solution (if the acid is not regenerated) is collected in a precipitation tank, to which a solution containing sulphate ions, for instance a spent sulphuric acid pickling liquor or a certain amount of sulphuric acid is first added and then a calculated amount of alkaline precipitation agent added, such as slaked lime.

In the precipitation of iron, chromium and nickel in a solution free of fluoride, the three metals can easily be separated because of their different solubility products. Thus the solubility of $Fe^{3+}$, $Cr^{3+}$ and $Ni^{2+}$ in solutions at 20°C is 1 mmole/l at pH 2.8, 4.9 and 9.8, respectively.

Figure 3:
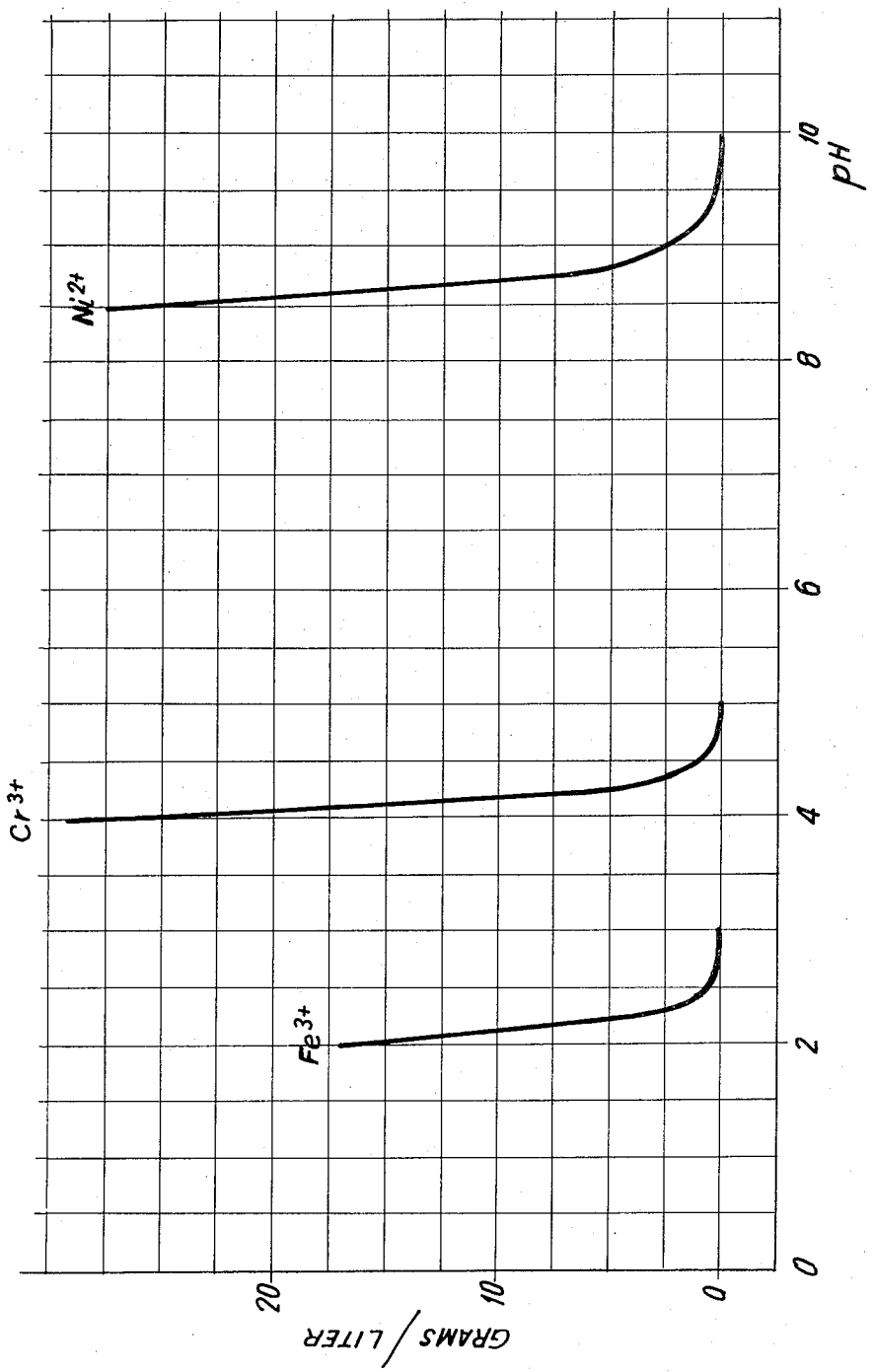

When the precipitation is carried out in a solution which also contains fluoride ions, an unexpectedly great influence on the solutions is obtained, arising from the fact that a much more complicated system is obtained, in which the stability constants of the metal fluoride complexes must be considered. The effect appears from FIG. 3, where the solubility as a function of pH is indicated for metal hydroxides without the presence of fluoride ions and FIG. 4, where the results from a precipitation test with a solution containing 25 g/l of fluoride are indicated.

The amount of precipitation agent is adjusted so that a precipitation of iron and chromium is obtained in this step, while nickel remains in solution.

This is obtained by carrying out the precipitation to a pH, which has been determined by preliminary experiments and which is to a certain degree dependent on the amount of fluoride present, the pH-value being within the range of 2–9, preferably within the range of 2–5 and in most technical cases within the range of 2–4.

Simultaneously with metal hydroxides, calcium fluoride is precipitated. The addition of sulphate ions is made to obtain a simultaneous precipitation of calcium sulphate (gypsum) and therefore the total amount of calcium hydroxide necessary is determined by the final pH, the amount of fluoride and the amount of sulphate added. The necessary amount, which in addition to the working conditions is dependent, i.a., on the quality of the precipitation agent used can be established by preliminary experiments.

In a technical embodiment, adjustment by means of the pH-value can be used on the basis of preliminary experiments made. Colorimetric analysis, which might also be used for control, is of good assistance when establishing the end point.

The precipitate obtained by simultaneous precipitation of gypsum is more easily dewatered. The resistance to filtration is lower and the dry content of the filter cake is higher. The amount of sulphate ion should exceed 20 g/l, preferably 40 g/l. The dewatering is made most easily if the precipitation is carried out at a high temperature, for instance above 30°C, preferably above 50°C.

The suspension from the precipitation tank in step 3 is dewatered in a suitable device, such as a vacuum filter. The filter cake may be washed to increase the yield of for instance nickel in the following step.

The solution from the dewatering step I (process step 4) is collected in a precipitation tank, and an alkaline precipitation agent is added. The amount thereof is calculated so that an almost total precipitation of included metal ions, such as nickel, is obtained. Suitable precipitation agents in this step are sodium hydroxide or potassium hydroxide. The precipitation is carried to a pH of at least 5 and not more than 11 (for recipient reasons), preferably to a pH within the range of 7–10. The amount of precipitation agent necessary to reach the correct pH can be established by pre-tests.

The suspension from the precipitation tank in step 5 is dewatered in a suitable device such as a vacuum filter. In a suitable embodiment a pair of polyelectrolytes is used which in preliminary experiments have been shown to react with each other to form a copolymer which encapsulates the suspended particles in its network structure thereby forming compact and easily dewatered floos. This filter cake consists substantially of nickel hydroxide which can be used after drying and calcination or any other suitable process for the manufacture of stainless steel.

The aqueous solution obtained after the last precipitation step contains only traces of metals, small amounts of fluoride and sulphate and nitrate ions. The solution can be discharged to the recipient without additional treatment.

In an advantageous embodiment potassium hydroxide is used as the precipitation agent in step 5. Potassium nitrate can then be recovered by cooling or evaporation of the solution, the potassium nitrate being crystallized and recovered in a following separation step, for instance by filtration on a vacuum filter.

In another advantageous embodiment potassium hydroxide is used as precipitation agent throughout. Calcium fluoride can then be recovered by precipitation with calcium hydroxide, after which potassium nitrate can be recovered in the same way as described above.

The following technical advantages are obtained with the process closely described above:

By the addition of alkali the metal ions of the pickling liquor are precipitated. By the division into two steps a precipitate of mainly nickel hydroxide is obtained in step II. This precipitate can be economically processed to give nickel oxide in contrast to a coprecipitate of iron and chromium and nickel hydroxides.

The main part of the neutralization and the precipitation is performed by a cheap chemical such as slaked lime.

By the use of calcium ions in the precipitation, calcium fluoride and calcium sulphate are simultaneously precipitated and in this way fluoride and sulphate ions evade the recipient. As the fluoride ions are bound by calcium, precipitation is facilitated in the following steps.

Precipitate I will contain gangue from the lime and precipitated calcium sulphate, which enhances the filterability of the precipitate.

Precipitate II is not contaminated by calcium fluoride, calcium sulphate or gangue from the lime.

By the acid regeneration a certain amount of acid is recovered, which can be recycled to the process. This especially applies to nitric acid. Moreover, constant pickling conditions in the pickling baths can be obtained.

By the addition of auxiliary chemicals to the precipitation before dewatering in step 6 a higher dry content is obtained in the precipitate than what would otherwise be possible.

The combination of acid regeneration, precipitation in two steps and slurry treatment with sulphate in step I and with auxiliary coagulants in step II thus form an advantageous combination from technical and economical points of view.

The utilization of the invention will be illustrated by the following examples, which should not be considered limitative to the invention claimed:

EXAMPLES

1. In laboratory tests an aqueous solution 0.4 molar in $Fe^{3+}$, 0.10 molar in $Cr^{3+}$, 0.05 molar in $Ni^{2+}$, 2 molar in $H^+$, 1.5 molar in F (total fluoride) and 2.15 molar in $NO_3^-$ was used. The separation of acid from metal was carried out in an ion exchange column having a volume of 50 ml and a height of 580 mm. The column was filled with a strongly basic anion exchange resin 20–50 mesh of styrene-divinyl benzene type with quaternary ammonium groups. In each test cycle 20 ml test solution was added, after which 60 ml distilled water was added as an eluent. An acid fraction of the volume 18 ml was taken out, having the following composition: 1.44 moles/l $H^+$, 0.44 moles/l $F^-$, 1.44 moles/l $NO_3^-$, 0.10 moles/l $Fe^{3+}$, 0.02 moles/l $Cr^{3+}$ and 0.01 moles/l $Ni^{2+}$. The yield of $H^+$ is thus about 66 percent, whereas about 24 percent of the metal salts are obtained in this fraction. FIG. 2 shows the concentrations in the eluate of the more important ions as a function of the volume of the eluate from a test cycle in this experiment.

2. In laboratory tests a spent pickling liquor from a nitric acid-hydrofluoric acid bath was used. Increasing amounts of calcium hydroxide were added, a precipitate of iron and chromium hydroxide being obtained. The concentration in the solution as a function of pH was measured, and a typical test result appears from FIG. 4 and from the following table.

| Test | Concentration g/l | | | Precipitated amount % | | |
|---|---|---|---|---|---|---|
| | $Fe^{3+}$ | $Cr^{3+}$ | $Ni^{2+}$ | $Fe^{3+}$ | $Cr^{3+}$ | $Ni^{2+}$ |
| Control | 61 | 3.6 | 4.6 | — | — | — |
| pH 2.5 | 1.5 | 0.9 | 4.0 | 97.5 | 73.6 | 13.0 |
| pH 3.1 | 0 | 0.3 | 3.6 | 100 | 91.7 | 21.8 |

3. Precipitations of spent pickling liquors at different temperatures were carried out on a laboratory scale. The specific resistance to filtration of the precipitates obtained was measured in the usual manner.

In the tests a solution containing 36 g/l $Fe^{3+}$, 6.4 g/l $Cr^{3+}$, 5.3 g/l $Ni^{2+}$, 9.8 g/l $F^-$, 115 g/l $NO_3$, 40 g/l $SO_4^{2-}$ was used. The precipitation was interrupted at pH 2.8. The result appears from the following table:

| Precipitation temperature C° | Spec. resistance to filtration $m^{-2}$ |
|---|---|
| 30 | ∞ |
| 50 | $0.87 \cdot 10^{14}$ |
| 70 | $0.89 \cdot 10^{14}$ |

4. Precipitations of spent pickling liquors to which different amounts of sulphate ion (spent sulphuric acid pickling liquor) had been added were performed on a laboratory scale. The specific resistance to filtration of the precipitates obtained was measured in the usual manner.

The tests were carried out at 50°C and were interrupted at pH 2.8. The results appear from the following table:

| | Concentration g/l | | | | | Spec. resistance to filtration $m^{-2}$ |
|---|---|---|---|---|---|---|
| $Fe^{3+}$ | $Cr^{3+}$ | $Ni^{2+}$ | $F^-$ | $SO_4^{2-}$ | $NO_3^-$ | |
| 39.4 | 7.1 | 6.5 | 12.2 | 0 | 143 | $\infty$ |
| 37.5 | 6.8 | 5.9 | 11.0 | 20 | 129 | $1.19 \cdot 10^{14}$ |
| 35.7 | 6.4 | 5.3 | 9.8 | 40 | 115 | $0.87 \cdot 10^{14}$ |
| 33.8 | 6.1 | 4.6 | 8.6 | 60 | 101 | $0.14 \cdot 10^{14}$ |

5. In a set of experiments precipitation was performed in two steps. In the first step calcium hydroxide was added to different end pH values for the precipitation of i.a., iron and chromium hydroxide. In the second step different alkalies were used for the precipitation of nickel hydroxide. The amount of precipitation agent was determined by interrupting the precipitation at pH 7. The results appear from the following table, which is connected with the table under point 2 above.

6. In a test, dewatering of the precipitate II was studied under different conditions. Precipitate II, which substantially consists of $Ni(OH)_2$ was practically impossible to filter without conditioning, independent of the preparation process.

In a conditioning test 4 ml of a 0.1% solution of a cationic polyelectrolyte (polyamine) and an equal amount of a solution of an nionic polyelectrolyte (polyacrylamide) were added one after the other to 200 ml of a suspension having a dry content of 10 g/l. The suspension was stirred after each addition. The specific resistance to filtration of the precipitate was then determined in the usual manner. At a pressure drop of $4.7 \times 10^4$ N/m² (380 mm Hg) a specific resistance to filtration of $0.55 \times 10^{14}$ m$^{-2}$ was obtained, which means that the precipitate can be dewatered in a technical scale on a vacuum filter of a resonable size.

7. After the precipitation of metals, gypsum and calcium fluoride in steps I and II an aqueous solution is obtained, which is almost free from contamination. The concentration in the water of different ions appears from the following table.

| pH | 7–8 |
|---|---|
| $F^-$(total), ppm | <20 |
| heavy metals, ppm | ~10 |
| $NO_3^-$, g/l | ~35 |
| $SO_4^{2-}$, g/l | ~1 |

| Precipitation step I | | Precipitation step II | | | Composition of the precipitate % | | |
|---|---|---|---|---|---|---|---|
| Final pH | Precipitation agent g | | Precipitation agent g | $Ni(OH)_2$ | $Fe(OH)_3$ | $Cr(OH)_3$ | $CaF_2$ |
| 2.5 | $Ca(OH)_2$ | 77 | $Ca(OH)_2$ | 39 | 30 | 13 | 9 | 48 |
| 3.1 | do. | 91 | do. | 25 | 61 | 0 | 5 | 34 |
| 2.5 | $Ca(OH)_2$ | 77 | NaOH | 30 | 57 | 26 | 17 | 0 |
| 3.1 | do. | 91 | do. | 19 | 92 | 0 | 8 | 0 |
| 2.5 | $Ca(OH)_2$ | 77 | KOH | 21 | 57 | 26 | 17 | 0 |
| 3.1 | do. | 91 | do. | 14 | 92 | 0 | 8 | 0 |

We claim:
1. A method of treating a spent nitric acid-hydrofluoric acid pickling solution containing about 0.1 to 3 mols per liter total of the metal ions iron, chromium and nickel, about 0.1 to 5 mols per liter of hydrogen ions and about 0.5 to 5 mols per liter of fluoride ions, wherein the iron, chromium and fluoride ions are substantially separated from nickel, wherein the nickel is recovered as a precipitate and wherein the remaining solution is rendered substantially nonpolluting which comprises, providing said solution with over 20 grams per liter of sulfate ions, adjusting said solution at above 30°C to a pH of about 2 to 5 by adding an alkaline compound selected from the group consisting of slaked lime, burnt lime and calcium carbonate in amounts sufficient to precipitate chromium and iron as the hydroxides together with precipitates of calcium fluoride and calcium sulfate, the presence of calcium sulfate enhancing the dewatering of the hydroxide precipitate during filtration, filtering said precipitate from said solution, adjusting the pH of the remaining solution to over 5 and up to 11 by adding an alkali selected from the group consisting of sodium hydroxide and potassium hydroxide to precipitate nickel as the hydroxide, separating the nickel precipitate from said solution, and then discarding the solution.

2. The method of claim 1, wherein the iron, chromium, fluoride and sulfate ions are precipitated by adjusting the pH of the solution to about 2 to 4.

3. The method of claim 2, wherein the solution following removal of the iron, chromium, fluoride and sulfate ions is adjusted to a pH of about 7 to 10 to precipitate the nickel as nickel hydroxide.

* * * * *